United States Patent
Tran et al.

(10) Patent No.: US 10,743,642 B2
(45) Date of Patent: Aug. 18, 2020

(54) RETENTION CLIP FOR A PORTABLE COMMUNICATION DEVICE

(71) Applicant: MOTOROLA SOLUTIONS, INC, Chicago, IL (US)

(72) Inventors: Chi T. Tran, Naperville, IL (US); Sze Yen Lim, Georgetown (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 53 days.

(21) Appl. No.: 16/308,832

(22) PCT Filed: Aug. 26, 2016

(86) PCT No.: PCT/MY2016/000054
§ 371 (c)(1),
(2) Date: Dec. 11, 2018

(87) PCT Pub. No.: WO2018/038595
PCT Pub. Date: Mar. 1, 2018

(65) Prior Publication Data
US 2019/0246776 A1    Aug. 15, 2019

(51) Int. Cl.
*A45F 5/02* (2006.01)
*H04B 1/3888* (2015.01)
(Continued)

(52) U.S. Cl.
CPC .............. *A45F 5/022* (2013.01); *A45F 5/02* (2013.01); *F16B 2/005* (2013.01); *F16B 2/241* (2013.01);
(Continued)

(58) Field of Classification Search
CPC . A45F 5/021; A45F 5/02; A45F 5/022; Y10T 24/1376; Y10T 24/1394; Y10T 24/1391
(Continued)

(56) References Cited

U.S. PATENT DOCUMENTS

| | | | |
|---|---|---|---|
| 1,102,922 A * | 7/1914 | Hoffman | A45C 13/185 24/3.5 |
| 1,568,889 A | 1/1926 | Eliasson | |
| 2,619,649 A | 12/1952 | Brown | |
| 4,111,343 A | 9/1978 | Selinko | |

(Continued)

FOREIGN PATENT DOCUMENTS

| | | |
|---|---|---|
| EP | 2387901 A1 | 11/2011 |
| WO | 2016032872 A2 | 3/2016 |

OTHER PUBLICATIONS

The International Search Report and the Written Opinion corresponding serial No. PCT/MY2016/000054 filed Aug. 26, 2016, all pages.

*Primary Examiner* — Adam J Waggenspack
(74) *Attorney, Agent, or Firm* — Barbara R. Doutre (57) ABSTRACT

A unitary metal clip (100) is formed of a pocket mounting side (102), a device mounting side (104) and a top end pocket flange (108) therebetween. The clip further comprises first and second side flanges (106) extending from the pocket mounting side (102) toward the top end pocket flange (108). The top end pocket flange (108) provides alignment, while first and second side flanges (106) provide slide-in, engagement, and grip features for clip (100). A recessed retention feature (114) is also provided within the pocket mounting side (102) to provide a compression feature of clip. A device mounting platform (130) is located on the device mounting side (104) extending from the top end pocket flange (108) of clip (100) for mounting to a device, such as a holster or directly to a communication device. Clip (100) provides stable, non-rotational positioning and retention for body worn portable communication device applications.

20 Claims, 7 Drawing Sheets

(51) Int. Cl.
*H04M 1/04* (2006.01)
*F16M 13/04* (2006.01)
*F16M 11/04* (2006.01)
*F16M 11/16* (2006.01)
*F16B 2/00* (2006.01)
*F16B 2/24* (2006.01)

(52) U.S. Cl.
CPC ........... *F16M 11/041* (2013.01); *F16M 11/16* (2013.01); *F16M 13/04* (2013.01); *H04B 1/3888* (2013.01); *H04M 1/04* (2013.01); *A45F 2200/0516* (2013.01); *H04R 2201/023* (2013.01)

(58) Field of Classification Search
USPC ......................................... 224/667, 194, 230
See application file for complete search history.

(56) References Cited

U.S. PATENT DOCUMENTS

| | | | | |
|---|---|---|---|---|
| 4,974,764 | A * | 12/1990 | Cantwell | A45F 5/02 224/269 |
| 5,819,379 | A * | 10/1998 | Van Hout | A41F 9/007 24/182 |
| 5,927,580 | A * | 7/1999 | Ward-Llewellyn | A45F 5/02 224/194 |
| D629,193 | S | 12/2010 | Liu | |
| 7,971,762 | B2 * | 7/2011 | Clifton, Jr. | A45F 5/02 224/197 |
| 8,508,921 | B2 * | 8/2013 | Su | F16B 2/245 224/666 |
| 2012/0047631 | A1 | 3/2012 | Connolly | |
| 2012/0205268 | A1 | 8/2012 | Kreger et al. | |
| 2014/0090212 | A1 * | 4/2014 | Miltner | A45F 5/02 24/506 |

* cited by examiner

RETENTION CLIP FOR A PORTABLE COMMUNICATION DEVICE

FIELD OF THE DISCLOSURE

The present invention relates generally to retention clips, and more particularly to a pocket retention clip for a portable communication device.

BACKGROUND

Holsters are often used to hold a portable communication device, such as a portable two-way radio. Many holsters include a coupling element, such as a clip, to allow the holster holding the radio to be worn either at a belt or on an epaulette of a user. For example, remote speaker microphone (RSM) type clips have been used to retain a radio at the shoulder epaulette. As the integration of video and photo type functions continue to be integrated within communication devices, belt worn operation has become less desirable and shoulder worn operation has become more desirable, particularly in certain areas of public safety where the ability to maintain a hands free environment is important. However, even a radio holstered and clipped in a shoulder worn application can encounter issues, particularly if enough force is applied, due to the RSM type clip's short length and limited retention force. Additionally, under some circumstances it may be difficult to minimize movement of shoulder mounted devices, which can result in video shake.

Accordingly, it would be beneficial to have an improved clip and mounting approach that would improve retention and reduce video shake during body worn applications.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein a clip for a portable electronic device, or other device requiring stable, fixed positioning for body worn applications. The clip is well suited to body-worn devices operating within a public safety environment, such as those mounted in a holster, and is particularly well suited for devices having video camera functionality where stability of the body wearable device is particularly important. The clip to be described herein comprises a plurality of alignment, lead-in and grip type features for non-removable and non-rotational stability for pocket mounted applications.

Figure 1:
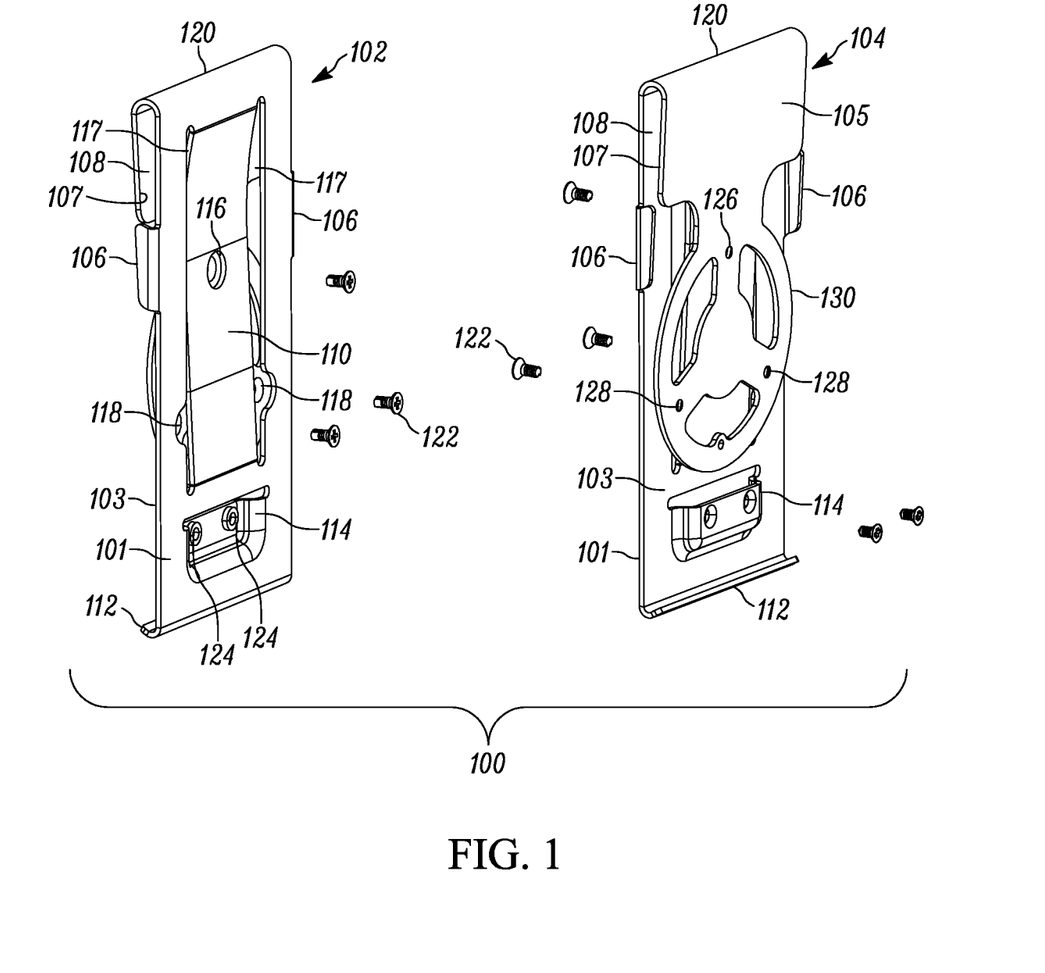
FIG. 1 is a clip formed in accordance with the various embodiments.

FIG. 1 is a clip 100 formed in accordance with the various embodiments. Clip 100 comprises a unitary metal piece part having a pocket mounting side 102 and a device mounting side 104 with a top end 120 having a pocket flange 108 formed therebetween, referred to as top end pocket flange 108. An attachment platform 130 is located on the device mounting side 104 extending from the top end pocket flange 108 for coupling to another device, such as a holster or directly to a communication device via a plurality of screws 122. The clip 100 further comprises first and second side flanges 106 extending from the pocket mounting side 102 beneath the top end pocket flange 108. In accordance with the various embodiments, the top end pocket flange 108 provides aligns for a top edge of a pocket and the first and second flanges 108 engage fabric of that pocket.

In accordance with the embodiments, the clip 100 comprises first and second side flanges 116 extending from the pocket mounting side 102 beneath the top end pocket flange 108, wherein the first and second side flanges 106 provide slide-in features while the clip is being mounted to a pocket. The first and second side flanges 106 also provide grip features in response to removal attempts of the clip from a pocket.

The pocket mounting side 102 further comprises a center spring 110 having a bend compression feature extending lengthwise between two slots 117. The pocket mounting side 102 further comprises a recessed retention feature 114 formed for example with a S-shape or other inward compression style shape, and located beneath the first and second flanges 106 and beneath the center spring 110. Both of these features provide compression to the pocket when the top end pocket flange 108 is aligned over the top edge of the pocket.

Pocket mounting side 102 may further comprise a J-hook 112 on a bottom end along the bottom edge of the pocket mounting side 102 beneath the recessed retention feature 114. The curved J portion faces toward fabric retention side.

The attachment platform 130 comprises threaded inserts 126, 128 on the device mounting side 104, for coupling to the plurality of screws 122. The center spring 110 of the pocket mounting side 102 may comprise an access cut-out 116 formed therein for accessing a screw hole 126 on the mounting platform of the device mounting side. A plurality of half-circular cutouts 118 adjacent and extending from each of the two slots 117 on the pocket mounting side 102, can provide access to screw holes located on the circular attachment platform 130 located on the device mounting side 104. Screws 122 mount through access cutouts 116 and 118 to threaded inserts 126, 128 of attachment platform 130 on the device mounting side 104.

Viewed relative to the clip alone, the pocket mounting side 102 of clip 100 can be said to further be formed of an exterior surface 101 and an interior surface 103. Viewed relative to the clip alone, the device mounting side 104 of clip 100 can be said to be formed an exterior device mount surface 105 and an interior device mount surface 107. In accordance with the various embodiments, the clip 100 is designed to receive a pocket between the interior surface 103 and interior device mount surface 107. However, given that the clip 100 is a single unitary metal piece part, which is formed of two generally parallel sides (the device mounting side 104 being shorter than the pocket mounting side 102), with the top end pocket flange 108 formed therebetween, the descriptions of the various embodiments will be provided in terms of the sides two sides 102, 104 rather than the individual surfaces associated therewith.

Figure 2A:
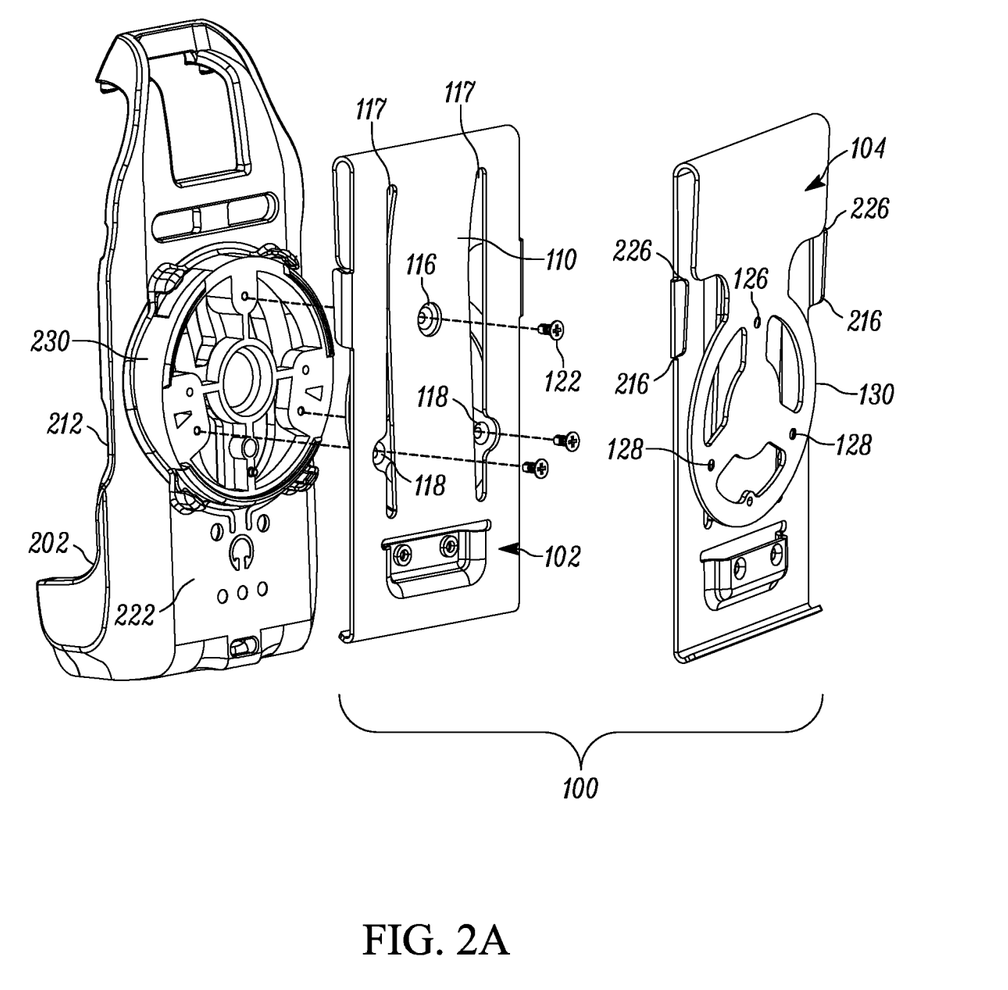
FIG. 2A shows the clip and a holster to which the clip attaches in accordance with some various embodiments.

FIG. 2A shows the clip 100 and a device 202 to which the clip will attach, in this example a holster in accordance with some various embodiments. The holster 202 comprises a first cradle surface 212 for receiving a communication device and has a back surface 222 with a holster attachment platform 230. For attachment, the center spring 110 with bend compression feature of the pocket mounting side 102 has an access cut-out 116 formed therein for accessing a threaded insert 126 on the circular attachment platform 130 of the device mounting side 104 through to a device 202, which in this embodiment is holster. Each of the two slots 117, of the pocket mounting side 102 have access half-circular cutouts 118 extended therefrom for accessing threaded inserts 128 located on the same circular attachment platform 130 of device mounting side 104. Attaching the attachment platform 130 extending from the top mounted pocket flange of the clip to a corresponding attachment platform of a device, in this case holster 202. Alternatively, the device may be the portable electronic device having video capability itself.

Figure 2B:
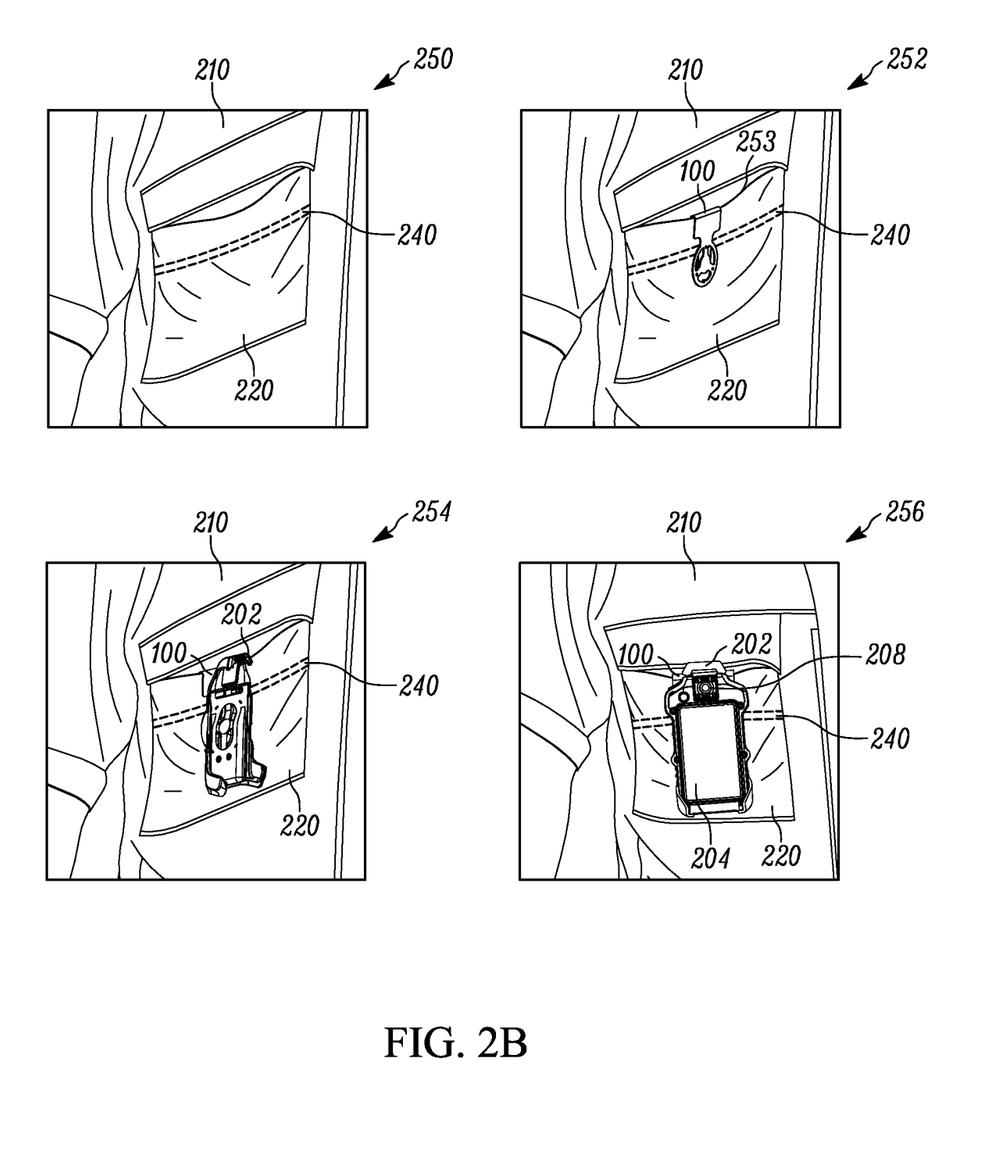
FIG. 2B portrays a method for clipping a video device to a vest pocket.

FIG. 2B portrays a method and apparatus for clipping a portable video communication device to a vest pocket. At view 250, a vest 210 having a pocket 220 formed therein comprises a shelf seam 240 sewn into the fabric. The clip 100 having a pocket mounting side 102 and a device mounting side 104 with a top end pocket flange 108 formed therebetween is inserted into the pocket 220 at view 252 (holster has been removed so that alignment can be seen in view 252). Aligning the top end pocket mounting flange 108 to a top edge 253 of the pocket 220 is shown in view 252. By inserting the pocket mounting side 102 of the clip 100 into the pocket 220 while the device mounting side 104 with device 202 attached thereto remains outside of the pocket is shown in view 254 provides for overall alignment of the clip 100. Portable communication device 204 having video capability is inserted and locked into holster 202 while the holster is securely coupled to pocket 220 via clip 100 in view 256.

By inserting the pocket mounting side 102 of the clip 100 into the pocket 220 while the device mounting side 104 with device 202 attached thereto remains outside of the pocket 220, provides in accordance with the various embodiments: engagement of the fabric of the pocket 220 between lead-in features of first and second side flanges 106 extending from the pocket mounting side 102; compressible application of pressure to the pocket 220 via the center spring 110 having a bend compression feature extending lengthwise between two slots 118 on the pocket mounting side 102; and compressible application of pressure to the pocket 220 via the recessed retention feature 114 formed in the pocket mounting side 102.

An upward, sideways, or rotational pull on the system comprising the holster 202, communication device 204, and/or clip 100 results in the flanges 106 catching upon the pocket shelf seam 240 and bite features 226 of the first and second side flanges 106 and in accordance with the various embodiments, retaining the system in place.

Figure 3:
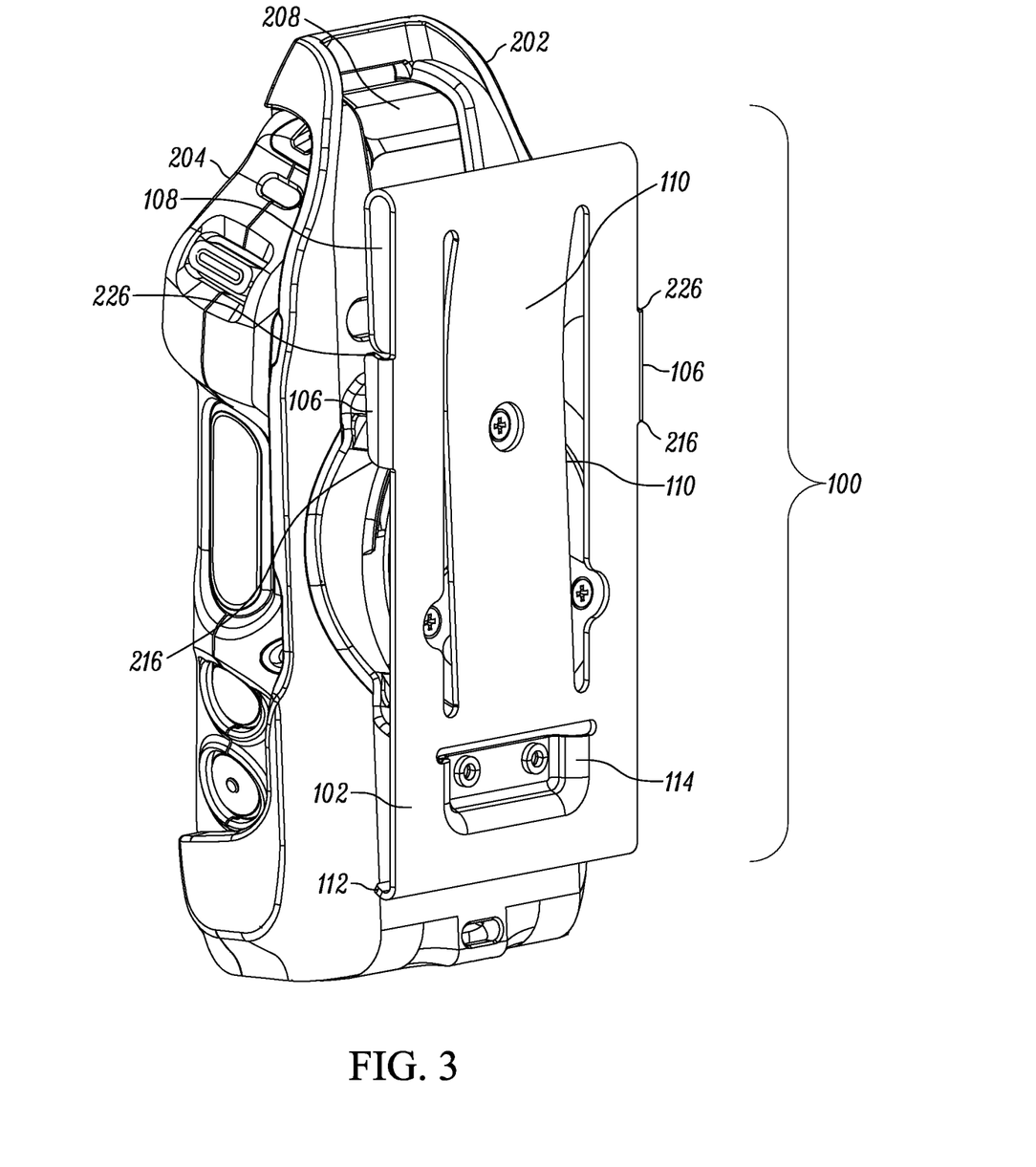
FIG. 3 shows clip holstered portable communication device in accordance with various embodiments.

FIG. 3 shows clip holstered portable communication device 204 in accordance with various embodiments. This view shows the system outside of a pocket so that the lead-in and grip features of the various embodiments can be clearly seen. In accordance with the various embodiments, top end pocket flange 108 is slanted, and downward sloping to provide alignment and retention for pocket mounting and anti-rotation of the clip and the system coupled to the clip. In accordance with the embodiments, the first and second side flanges 106 extending from the pocket mounting side 102 beneath the top end pocket flange 108 provide slide-in functionality while the clip 100 is being mounted to a pocket, and further provide grip functionality during attempts to remove the clip from a pocket. The slide-in functionality is provided by lead-in features 216 while the grip functionality is provided by bite features 226 on each flange 106. The first and second side flanges 106 also minimize rotation by engaging the pocket fabric within the flanges 106 upon slide in of the clip 100 into a pocket. Recessed retention feature 114 provides improved compression, via for example an S-shaped protrusion feature. The center spring 110 having the bend compression feature extending lengthwise provides compression. When inserted within a pocket this lengthwise compression will compress against the pocket. The J-hook 112 provides a final grasping point for compressing against the pocket fabric in response to an upward pull or an upward tension on the clip 100.

Figure 4:
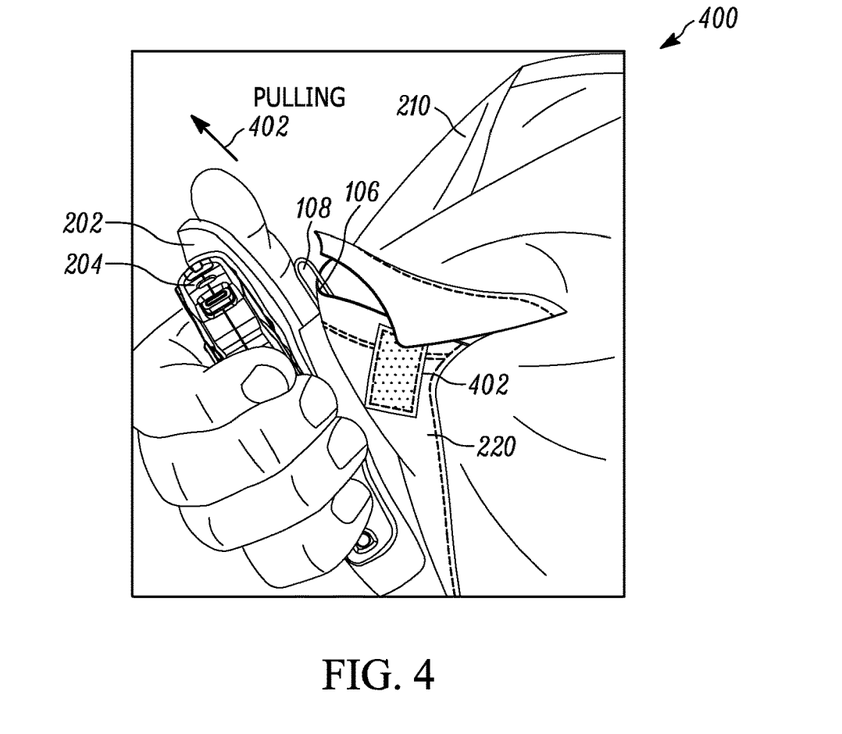
FIGS. 4, 5, and 6 show different views of the clip holstered portable communication device being worn on a pocket and subjected to different tension scenarios in accordance with various embodiments.
Figure 5:
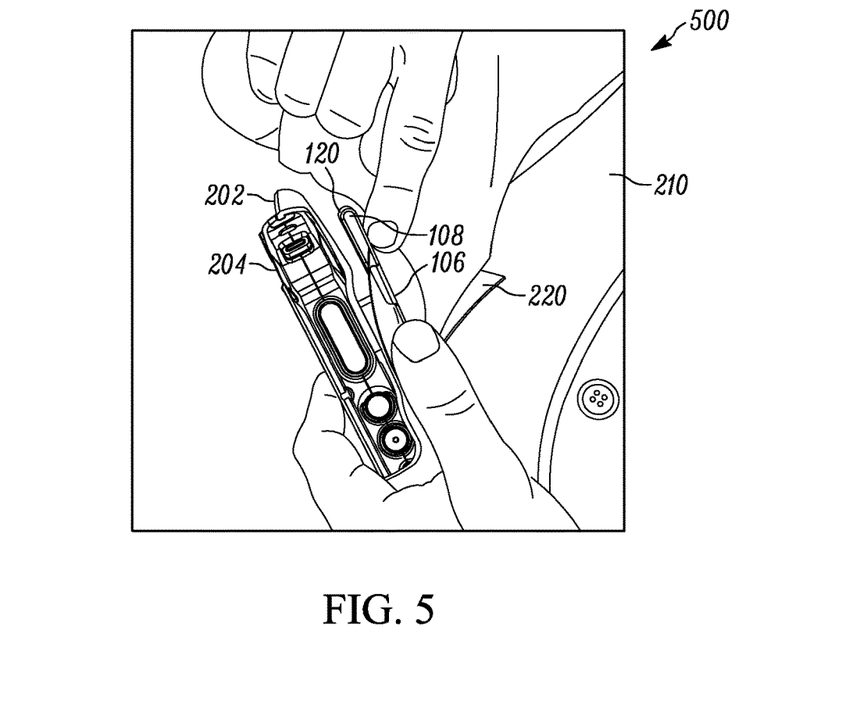
Figure 6:
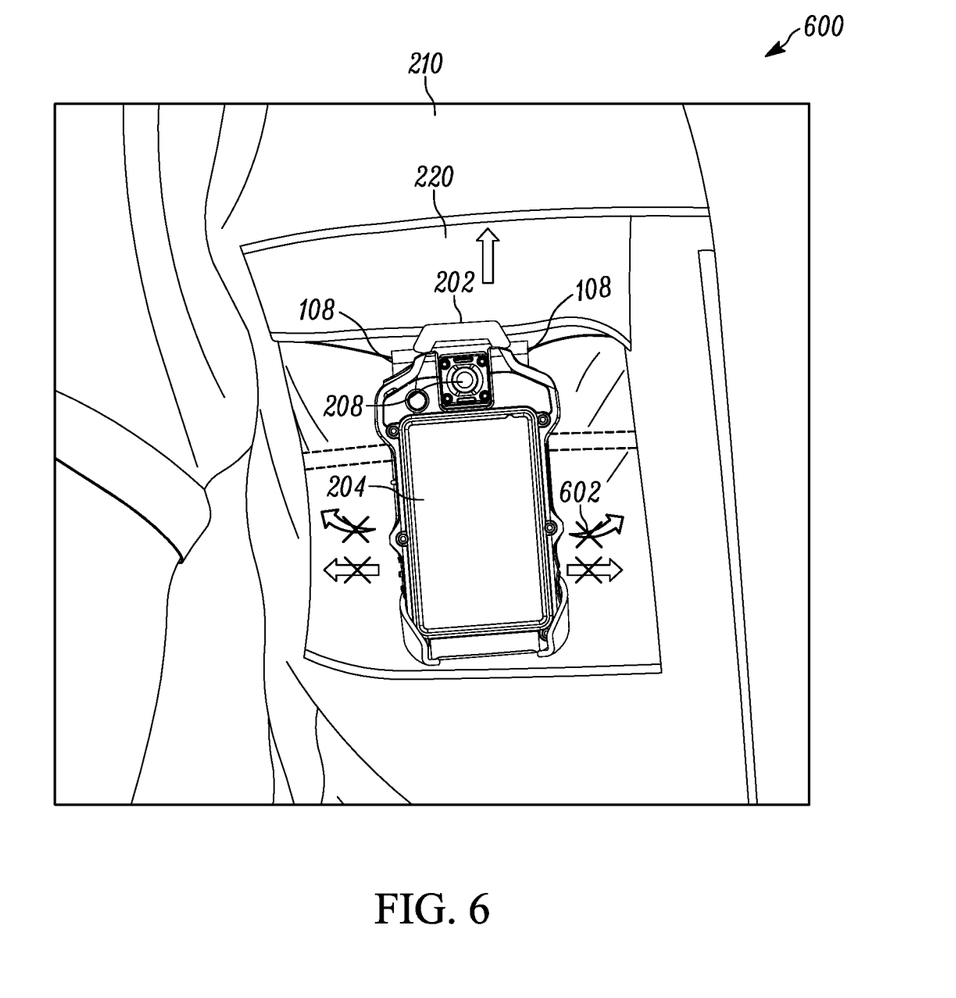

FIGS. 4, 5, and 6 show different views of the clip holstered portable communication device 204 being worn on a pocket under different scenarios in accordance with various embodiments. In these embodiments, the portable communication device 204 is locked into the holster 202. FIG. 4 shows a scenario 400 in which the portable communication device is being pulled 402 in a slightly upward and horizontal direction away from the body. The pocket mounting side 102 of clip 100 is inside pocket 220 and the top end pocket flange 108 is just partially shown at the top edge of the pocket. In response to the pull 402, the top end pocket flange 108 remains aligned over the pocket 220, and the first and second side flanges 106 catch and bite the inside shelf seam 240 of the pocket 220. The recessed retention feature 114 (inside the pocket) provides a compression force on the pocket. Hence, removal of the system is prevented. The center spring 110 having the bend compression feature provides further compression on the pocket. FIG. 5 is provided to show how the top end pocket flange 108 is sloped downward towards the first and second flanges 106. This view also shows the first and second flanges 106 each comprise the lead-in feature 216 at a lower end of each flange 106 and a bite feature 226 at an upper end of each flange 106. The lead-in feature 216 facilitates sliding while the bite feature 226 grips the fabric in response to an upward pull on the pocket.

FIG. 6 is provided to show the limited movement 602 of the communications system when mounted within the pocket 220 using clip 100 of the various embodiments. The top end pocket flange 108 is aligned and retained within pocket 220 with the holster 202 retaining the portable communication device 202, as previously described. The improved clip 100 and pocket wearing application will maintain the communication device 204 in a stable position during this body worn application. The non-side-to-side, non-rotational and non-upward movement 602 allows the communications device 202, and particularly desirable camera 208 to remain stable during video recording applications. This improved stable mounting will reduce video shake of camera 208. The improved retention force will further minimize occurrences of theft.

Accordingly, the clip 100 comprising the plurality of alignment, lead-in and grip type features provides the advantages of non-removable and non-rotational stability for pocket mounted applications. Camera 208 is able to take video or pictures under very stable conditions without video camera shake. The secure pocket application also advantageously removes issues associated with an electronic device being pulled, grabbed, or knocked off from an epaulette.

Figure 7:
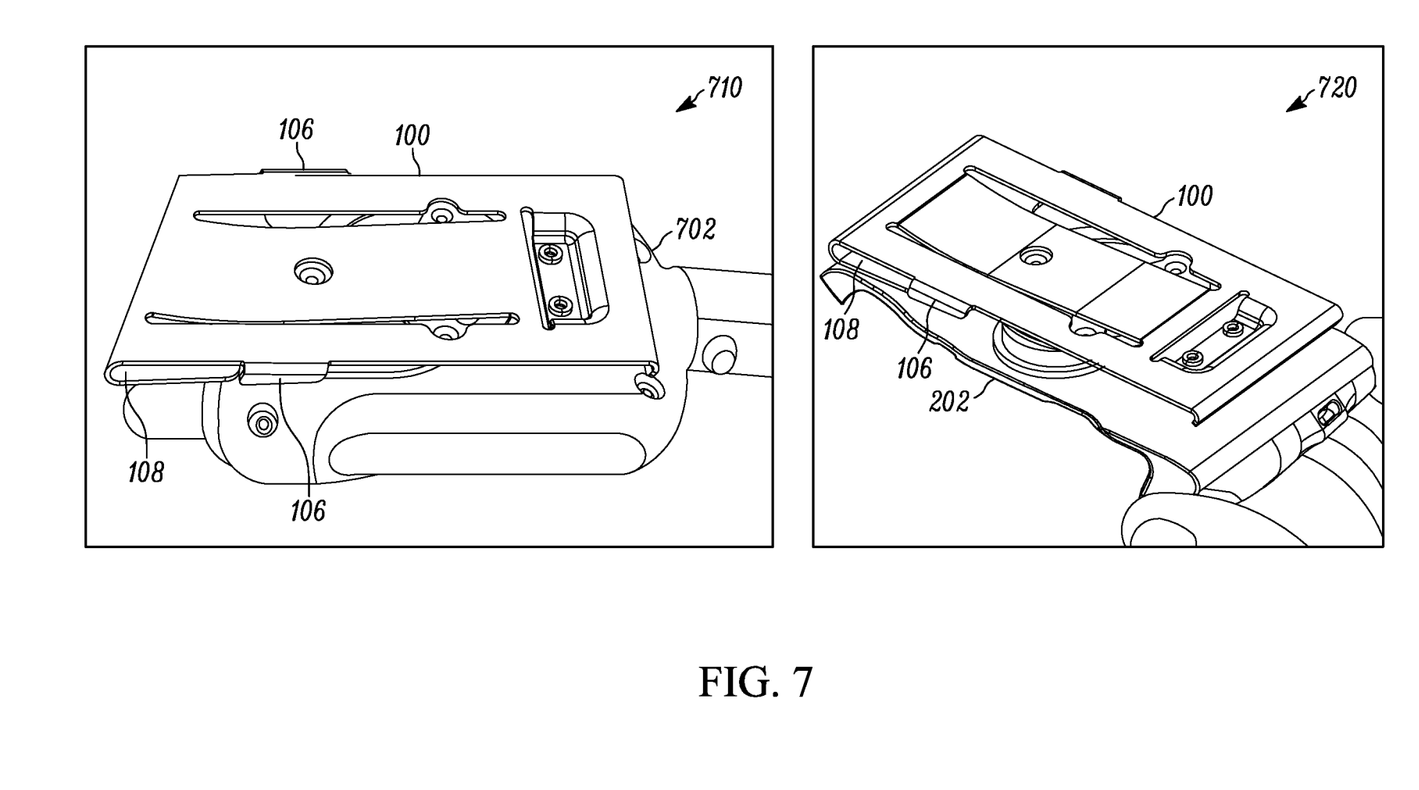
FIG. 7 shows examples the clip coupled to the holster and to a remote speaker microphone (RSM).

FIG. 7 shows examples the clip 100 coupled to the holster 202 in view 720, and directly to a device having video capability, without a holster, in view 710. Thus, the clip 100 can be used to clip other video devices in need of stability. Any device requiring a stable mounting in a body-worn environment can take advantage of the clip 100 and the retaining benefits along with anti-removal and anti-rotational features that the clip provides. The stability the clip 100 provides for body worn video communication devices is extremely beneficial, particularly in public safety environments where steady video and secure attachment and placement to clothing is important.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A clip, comprising:
   a unitary metal piece part having a device mounting side and a pocket mounting side with a top end pocket flange formed therebetween;
   a mounting platform located on the device mounting side extending from the top end pocket flange;
   first and second side flanges extending from the pocket mounting side beneath the top end pocket flange, the first and second side flanges providing slide-in features and grip features;
   a center spring having a bend compression feature extending lengthwise between two slots on the pocket mounting side; and
   a recessed retention feature formed in the pocket mounting side located beneath the first and second flanges and the compression member of the center spring.

2. The clip of claim 1, wherein the top end pocket flange formed between device mounting side and the pocket mounting side provides alignment insertion.

3. The clip of claim 1, wherein the top end pocket flange is sloped downward towards the first and second flanges.

4. The clip of claim 1, wherein the first and second flanges each comprise a lead-in feature at a lower end of each flange and a bite feature at an upper end of each flange.

5. The clip of claim 1, wherein the first and second side flanges extending from the pocket mounting side beneath the top end pocket flange provide slide-in features while the clip is being mounted to a pocket and provide grip features during an attempt to remove the clip from the pocket.

6. The clip of claim 5, wherein the lead-in features on each of the first and second side flanges allow for insertion of the clip into a pocket and each bite feature on the upper end of each of the first and second flanges prevents removal of the clip from the pocket.

7. The clip of claim 1, wherein the center spring of the pocket mounting side has an access cut-out formed therein for accessing a screw hole on the mounting platform of the device mounting side.

8. The clip of claim 1, further comprising have half-circular cutouts extending from each of the two slots on the pocket mounting side, the half-circular cutouts and adjacent slot providing access to first and second screw holes located on the circular mounting platform located on the device mounting side.

9. The clip of claim 1, wherein the top end pocket flange aligns the clip over a pocket, the first and second side flanges engage and catch the clip to an inside seam of the pocket, and the recessed retention feature provides a compression force on the pocket.

10. The clip of claim 9, wherein the center spring and bend compression bend compression feature provide additional compression force to the pocket.

11. The clip of claim 1, wherein the first and second side flanges engage and catch the clip to pocket, while the recessed retention feature provides a compression force on the pocket, thereby providing vertical and sideways retention.

12. The clip of claim 1, further comprising a J-hook on a bottom end of the pocket mounting side beneath the recessed retention feature.

13. The clip of claim 1, wherein the first and second side flanges, the center spring with bend compression feature, the recessed retention feature, the J-hook.

14. A method for clipping a video device to a vest pocket, comprising:
providing a clip having a device mounting side and a pocket mounting side with a top end pocket flange formed therebetween;
attaching an attachment platform extending from the top mounted pocket flange of the clip to a corresponding attachment platform of a device;
aligning the top end pocket mounting flange to the pocket of the vest;
inserting the pocket mounting side of the clip into the pocket while the device mounting side with device attached thereto remains outside of the pocket, thereby:
engaging fabric of the pocket between lead-in features of first and second side flanges extending from the pocket mounting;
compressibly applying pressure to the pocket via a center spring having a bend compression feature extending lengthwise between two slots on the pocket mounting side; and
compressibly applying pressure to the pocket via a recessed retention feature formed in the pocket mounting side.

15. The method of claim 14, further comprising:
attempting to move the device out of the pocket being prevented by bite features of the first and second side flanges.

16. A body wearable retention system for a portable communication device, comprising:
a vest having a pocket formed therein;
a holster for receiving the portable communication device on a first cradle surface and having a back surface with an attachment platform;
a unitary metal clip comprising:
a device mounting side and a pocket mounting side with a top end pocket flange formed therebetween;
a corresponding platform located on the device mounting side for coupling the unitary metal clip to the attachment platform of the holster; and
first and second side flanges extending from the pocket mounting side, the unitary metal clip being aligned to and retained within the pocket of the vest by the top end pocket flange and by first and second side flanges; and
a recessed retention feature formed within the pocket mounting side of the unitary metal clip, the recessed retention feature providing compression to the pocket.

17. The retention system of claim 16, wherein the unitary metal clip further comprises a bottom end J-hook formed therein.

18. The portable communication system of claim 16, further comprising:
a center spring with bend feature located between two slots on the pocket mounting side providing additional compression on the pocket.

19. The portable communication system of claim 15, wherein the first and second side flanges protrude inward into pocket thereby providing resistance against upward removal forces.

20. The portable communication system of claim 15, wherein the pocket comprises a shelf seam sewn into the fabric, the first and second flanges catching upon the pocket shelf seam in response to an upward pull on the system.

* * * * *